US010997697B1

(12) United States Patent
Newman

(10) Patent No.: US 10,997,697 B1
(45) Date of Patent: May 4, 2021

(54) METHODS AND APPARATUS FOR APPLYING MOTION BLUR TO OVERCAPTURED CONTENT

(71) Applicant: GoPro, Inc., San Mateo, CA (US)

(72) Inventor: David A. Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 174 days.

(21) Appl. No.: 16/235,292

(22) Filed: Dec. 28, 2018

(51) Int. Cl.
*G06T 5/00* (2006.01)
*G06T 7/11* (2017.01)
*H04N 5/232* (2006.01)
*G06T 5/20* (2006.01)
*G06T 7/194* (2017.01)

(52) U.S. Cl.
CPC ............... *G06T 5/002* (2013.01); *G06T 5/20* (2013.01); *G06T 7/11* (2017.01); *G06T 7/194* (2017.01); *H04N 5/23238* (2013.01)

(58) Field of Classification Search
None
See application file for complete search history.

(56) References Cited

U.S. PATENT DOCUMENTS

| | | | |
|---|---|---|---|
| 9,836,831 B1 * | 12/2017 | Krishnaswamy | G06T 7/269 |
| 10,404,915 B1 * | 9/2019 | Chen | H04N 5/23258 |
| 10,666,844 B2 * | 5/2020 | Qi | H04N 5/2254 |
| 2011/0214072 A1 * | 9/2011 | Lindemann | G01C 11/02 |
| | | | 715/757 |
| 2017/0366803 A1 * | 12/2017 | Kerstein | H04N 5/2252 |
| 2018/0070015 A1 * | 3/2018 | Hubei | G06T 5/002 |
| 2018/0276800 A1 * | 9/2018 | Abbas | H04N 5/2251 |
| 2019/0130585 A1 * | 5/2019 | Tandon | G06T 5/003 |
| 2019/0208124 A1 * | 7/2019 | Newman | H04N 5/23238 |
| 2019/0347771 A1 * | 11/2019 | Suszek | G06T 5/50 |

OTHER PUBLICATIONS

Adaptive block-based approach to image stabilization. Tico (Year: 2008).*

* cited by examiner

*Primary Examiner* — Delomia L Gilliard
(74) *Attorney, Agent, or Firm* — Esplin & Associates, PC

(57) ABSTRACT

Apparatus and methods for applying motion blur to over-capture content. In one embodiment, the motion blur is applied by selecting a number of frames of the captured image content for application of motion blur; selecting a plurality of pixel locations within the number of frames of the captured image content for the application of motion blur; applying motion blur to the captured image content in accordance with the selected number of frames and the selected plurality of pixel locations; and outputting the captured image content with the applied motion blur. In some implementations, motion blur is applied via implementation of a virtualized neutral density filter. Computerized devices and computer-readable apparatus for the application of motion blur are also disclosed.

20 Claims, 9 Drawing Sheets

METHODS AND APPARATUS FOR APPLYING MOTION BLUR TO OVERCAPTURED CONTENT

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to storing, processing and/or presenting of image data and/or video content, and more particularly in one exemplary aspect to providing motion blur to overcapture (e.g., 360°) content.

Description of Related Art

Motion blur is caused via capture of a scene where there are, for example, rapidly moving objects within the captured scene and may further be exacerbated by relatively long exposure times during image capture. As a result, motion blur artifacts are characterized by an apparent "streaking" of one or more objects in the captured image or captured sequence of images (e.g., multiple frames of captured video content). Motion blur artifacts are typically associated with single vantage point cameras. More recently, panoramic image capture devices, such as the GoPro Fusion camera manufactured by the Assignee hereof, have been introduced into the marketplace. However, there can be a disparity between the apparent motion of the object of interest and the background scene such that both the object of interest and the background may appear to be unnaturally focused (or sharp).

This may be particularly problematic when rendering so-called viewports from this so-called "over captured" panoramic content. The rendering of viewports of captured panoramic content is described in, for example, co-owned and co-pending U.S. patent application Ser. No. 16/107,422 filed on Aug. 21, 2018, and entitled "METHODS AND APPARATUS FOR OVERCAPTURE STORYTELLING", which claims the benefit of priority to U.S. Provisional Application Ser. No. 62/612,032 filed on Dec. 29, 2017 of the same title, each of which is incorporated herein by reference in its entirety. While techniques exist for adding blur during post-processing of this captured content, these techniques are often very computationally expensive. For example, one such technique involves the use of multiple pixel-by-pixel computations of optical flow, which may be unsuitable for use in, for example, mobile device applications, which the average user of a wider field of view (FOV) (e.g., 360°) image capture device may often use.

Additionally, spherical (e.g., 360°) cameras benefit from short shutter times to enable stabilization. In-camera motion blur, exacerbated by relatively long exposure/shutter times, can therefore de-stabilize the overcapture (e.g., 360°) content. Furthermore, although in-camera motion blur can be produced by using a longer shutter time, a larger F-stop, and/or adding neutral density filters, none of these options is viable for spherical cameras. Accordingly, post-processing motion blur is preferred over the addition of in-camera motion blur to retain the stabilization benefits of these short shutter times. However, when using these relatively short shutter times adding motion to the image in post-processing can cause motion judder.

To these ends, solutions are needed to facilitate motion blur post-processing for wider FOV (e.g., overcapture) content. Ideally, such solutions would enable users to seamlessly and more rapidly post-process this captured wider FOV content in order to produce a more "natural" look and feel for their edited content, as well as smooth out motion judder caused by the post-processing. Additionally, such solutions should encourage a user's use of wider FOV image capture devices.

SUMMARY

The present disclosure satisfies the foregoing needs by providing, inter alia, methods and apparatus for applying motion blur to, for example, overcapture content.

In one aspect, a method for blurring captured image content is disclosed. In one embodiment, the method includes: selecting a number of frames of the captured image content for application of motion blur; selecting a plurality of pixel locations within the number of frames of the captured image content for the application of motion blur; applying motion blur to the captured image content in accordance with the selected number of frames and the selected plurality of pixel locations; and outputting the captured image content with the applied motion blur.

In one variant, the method further includes performing foreground/background segmentation on the captured image content prior to the selecting of the plurality of pixel locations.

In another variant, the selecting of the pixel locations includes selecting portions of the frames associated with background portions of the frames.

In yet another variant, the selecting of the number of frames comprises selecting a sequential number of frames of the captured image content for the application of motion blur.

In yet another variant, the selecting of the number of frames includes selecting a non-sequential number of frames of the captured image content for the application of motion blur.

In yet another variant, the selecting of the pixel locations within the number of frames of the captured image content for the application of motion blur includes selecting based a color value for a respective pixel within the number of frames.

In yet another variant, the applying of the motion blur includes using an averaging filter for the applying of the motion blur, the using of the averaging filter includes assigning an average pixel color value over the number of frames to a respective pixel location.

In another aspect, a method of implementing a virtualized neutral density filter is disclosed. In one embodiment, the method includes capturing panoramic imaging content with an image capture device; stabilizing a viewport position within the captured panoramic imaging content; reversing the stabilizing of the viewport position within the captured panoramic imaging content; and adding motion blur to the reversed stabilized panoramic imaging content.

In one variant, the adding of the motion blur to the reversed stabilized panoramic imaging content includes adding the motion blur in accordance with angular motion associated with the image capture device.

In another variant, the adding of the motion blur in accordance with the angular motion associated with the image capture device is applied on a per-frame basis.

In yet another variant, the method further includes presenting options to a user that enables the user to adjust an amount of judder introduced into the captured panoramic imaging content.

In yet another variant, the stabilizing of the viewport position includes a full direction-locked stabilization.

In yet another variant, the method further includes reducing rolling shutter artifacts via the stabilizing of the viewport position and the reversing of the stabilizing of the viewport position.

In yet another aspect, a non-transitory computer-readable apparatus for performing the aforementioned methods are disclosed. In one embodiment, the non-transitory computer-readable apparatus includes a storage medium, the storage medium having computer-readable instructions stored thereon, the computer-readable instructions being configured to, when executed by a processing apparatus, blur captured image content via: receipt of a selection of a number of frames of the captured image content for application of motion blur; receipt of a selection of a plurality of pixel locations within the number of frames of the captured image content for the application of motion blur; apply motion blur to the captured image content in accordance with the selected number of frames and the selected plurality of pixel locations; and output the captured image content with the applied motion blur.

In one variant, the computer-readable instructions, when executed by the processing apparatus, are further configured to: perform foreground/background segmentation on the captured image content prior to the selection of the plurality of pixel locations.

In another variant, the receipt of the selection of the pixel locations includes receipt of selection for portions of the frames associated with background portions of the frames.

In yet another variant, the receipt of the selection of the number of frames includes receipt of a selection of a sequential number of frames of the captured image content for the application of motion blur.

In yet another variant, the receipt of the selection of the number of frames includes receipt of a selection of a non-sequential number of frames of the captured image content for the application of motion blur.

In yet another variant, the receipt of the selection of the pixel locations within the number of frames of the captured image content for the application of motion blur includes receipt of a selection based on a color value for a respective pixel within the number of frames.

In yet another variant, the application of the motion blur includes use of an averaging filter for the application of the motion blur, the use of the averaging filter includes assignment of an average pixel color value over the number of frames to a respective pixel location.

In yet another aspect, an apparatus for performing the aforementioned methods are disclosed. In one embodiment, the apparatus includes a computing system that includes a processor and a non-transitory computer-readable apparatus.

In one variant, the apparatus includes a laptop or desktop computer.

In another variant, the apparatus includes an image capture device. In one embodiment, the image capture device includes a processor, a computer-readable apparatus and a plurality of image sensors that are configured to capture panoramic image content.

Other features and advantages of the present disclosure will immediately be recognized by persons of ordinary skill in the art with reference to the attached drawings and detailed description of exemplary embodiments as given below.

All Figures disclosed herein are © Copyright 2018 GoPro Inc. All rights reserved.

DETAILED DESCRIPTION

Implementations of the present technology will now be described in detail with reference to the drawings, which are provided as illustrative examples and species of broader genus' so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Wider FOV (Panoramic) Image Capture Device—

Panoramic content (e.g., content captured using 180 degree, 360-degree view field, and/or other wider fields of view) and/or virtual reality (VR) content, may be characterized by high image resolution (e.g., 8192×4096 pixels at 90 frames per second (also called 8K resolution)) and/or high bit rates (e.g., up to 100 megabits per second (mbps)). Imaging content characterized by full circle coverage (e.g., 180°×360° or 360°×360° field of view) may be referred to as spherical content. Panoramic and/or virtual reality content may be viewed by a client device using a "viewport" into the extent of the panoramic image. As used herein, the term "viewport" may refer generally to an actively displayed region of larger imaging content that is being displayed, rendered, or otherwise made available for presentation. For example, and as previously alluded to, a panoramic image or other wide FOV content is larger and/or has different dimensions than the screen capabilities of a display device. Accordingly, a user may select only a portion of the content for display (i.e., the viewport) by, for example, zooming in/out on a spatial position within the content. In another example, a 2D viewpoint may be rendered and displayed dynamically based on a computer model of a virtualized 3D environment, so as to enable virtual reality, augmented reality, or other hybridized reality environments.

Figure 1A:
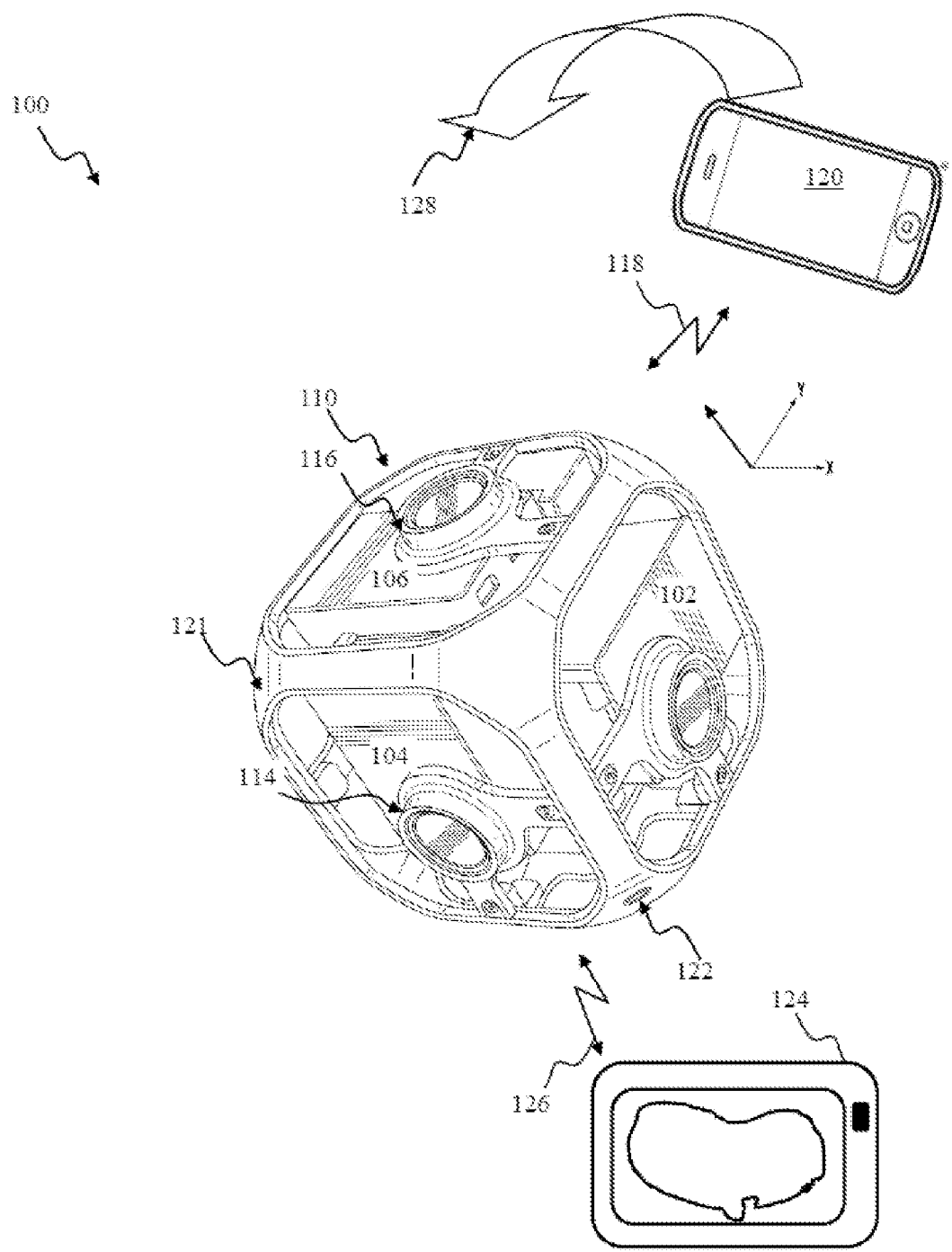
FIG. 1A is a functional block diagram illustrating an exemplary system for panoramic content capture and viewing, in accordance with the principles of the present disclosure.

FIG. 1A illustrates a capture system 100 configured for acquiring panoramic content, in accordance with one implementation. The system 100 of FIG. 1A may include a capture apparatus 110, such as an action camera manufactured by the Assignee hereof. The capture apparatus 110 may include, for example, 6-cameras (including, e.g., cameras 104, 106, 102 with the other 3-cameras hidden from view) disposed in a cube-shaped cage 121. The cage 121 may be outfitted with a mounting port 122 configured to enable attachment of the camera to a supporting structure (e.g., tripod, photo stick). The cage 121 may provide a rigid support structure. Use of a rigid structure may, inter alia, ensure that orientation of individual cameras with respect to one another may remain at a given configuration during operation of the apparatus 110. Individual capture devices (e.g., camera 102) may include a video camera device, such as that described in, for example, U.S. patent application Ser. No. 14/920,427 entitled "APPARATUS AND METHODS FOR EMBEDDING METADATA INTO VIDEO STREAM" filed on Oct. 22, 2015, now U.S. Pat. No. 9,681,111, the foregoing being incorporated herein by reference in its entirety.

Figure 1B:
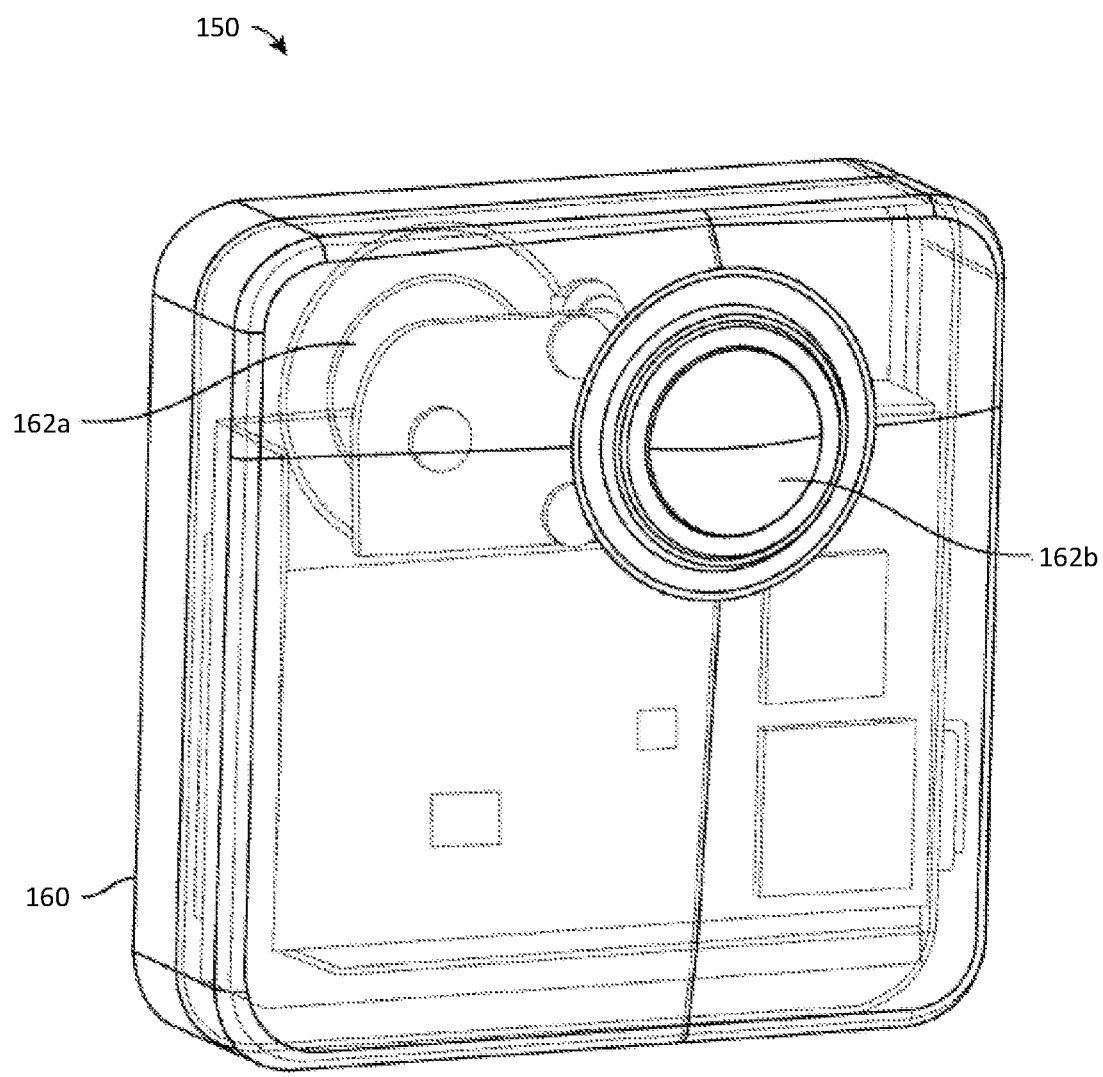
FIG. 1B is a perspective view illustrating another exemplary system for panoramic content capture and viewing, in accordance with the principles of the present disclosure.

In some implementations, the capture device may include two (2) spherical (e.g., "fish eye") cameras that are mounted in a back-to-back configuration (also commonly referred to as a "Janus" configuration). For example, the GoPro Fusion image capture device manufactured by the Assignee hereof, is one such example of a capture device with its cameras mounted in a back-to-back configuration. As used herein, the term "camera" includes, without limitation, sensors capable of receiving electromagnetic radiation, whether in the visible band or otherwise (e.g., IR, UV), and producing image or other data relating thereto. The two (2) source images in a Janus configuration have a 180° or greater field of view (FOV); the resulting images may be stitched along a boundary between the two source images to obtain a panoramic image with a 360° FOV. The "boundary" in this case refers to the overlapping image data from the two (2) cameras. FIG. 1B illustrates one such exemplary capture device 150 configured to capture panoramic content. The image capture device 150 includes a camera body 160 having two camera lenses 162 structured on a front and back surfaces of the camera body 160, various indicators on the front and/or back surface of the camera body (such as LEDs, displays, and the like), various input mechanisms (such as buttons, switches, and touch-screen mechanisms), and electronics (e.g., imaging electronics, power electronics, etc.) internal to the camera body 160 for capturing images via the camera lenses 162 and/or performing other functions. The two lenses 162 are oriented in opposite directions and couple with two images sensors mounted on circuit boards internal to the camera body 160. Other electrical camera components (e.g., an image processor, camera SoC (system-on-chip), etc.) may also be included on a circuit board within the camera body 160. The exemplary image capture device 150 illustrated in FIG. 1B is described in, for example, U.S. Design Patent Application Ser. No. 29/548,661, entitled "MULTI-LENS CAMERA" filed on Dec. 15, 2015, and U.S. patent application Ser. No. 15/057,896, entitled "UNIBODY DUAL-LENS MOUNT FOR A SPHERICAL CAMERA" filed on Mar. 1, 2016, each of which is incorporated herein by reference in its entirety.

Stitching may be necessary to reconcile differences between pixels of the source images introduced based on for example, lighting, focus, positioning, lens distortions, color, etc. Stitching may stretch, shrink, replace, average, and/or reconstruct imaging data as a function of the input images. In some implementations, the natively captured panoramic content may be re-projected into a format associated with, for example, single vantage point cameras such as that described in co-owned U.S. Provisional Patent Application Ser. No. 62/612,041 filed Dec. 29, 2017 and entitled "Methods and Apparatus for Re-Projection of Panoramic Content", the contents of which being incorporated herein by reference in its entirety.

Referring back to FIG. 1A, the capture apparatus 110 may be configured to obtain imaging content (e.g., images and/or video) with a 360° FOV, also referred to as panoramic or spherical content, such as, for example, those shown and described in U.S. patent application Ser. No. 14/949,786, entitled "APPARATUS AND METHODS FOR IMAGE ALIGNMENT" filed on Nov. 23, 2015, now U.S. Pat. No. 9,792,709, and/or U.S. patent application Ser. No. 14/927,343, entitled "APPARATUS AND METHODS FOR ROLLING SHUTTER COMPENSATION FOR MULTI-CAMERA SYSTEMS", filed Oct. 29, 2015, each of the foregoing being incorporated herein by reference in its entirety. As described in the above-referenced applications, image orientation and/or pixel location may be obtained using camera motion sensor(s). Pixel location may be adjusted using camera motion information in order to correct for rolling shutter artifacts. As described in the above-referenced U.S. patent application Ser. No. 14/949,786, images may be aligned in order to produce a seamless stitch in order to obtain the composite frame source. Source images may be characterized by a region of overlap. A disparity measure may be determined for pixels along a border region between the source images. A warp transformation may be determined using an optimizing process configured to determine displacement of pixels of the border region based on the disparity. Pixel displacement at a given location may be constrained in a direction that is tangential to an epipolar line corresponding to the location. A warp transformation may be propagated to pixels of the image. Spatial and/or temporal smoothing may be applied. In order to obtain an optimized solution, the warp transformation may be determined at multiple spatial scales.

In one exemplary embodiment, the individual cameras (e.g., cameras 102, 104, 106) may be characterized by a FOV, such as 120° in longitudinal dimension and 60° in latitudinal dimension. In order to provide for an increased overlap between images obtained with adjacent cameras, the image sensors of any two adjacent cameras may be configured to overlap a field of view of 60° with respect to one another. By way of a non-limiting illustration, the longitudinal dimension of a camera 102 sensor may be oriented at 60° with respect to the longitudinal dimension of the camera 104 sensor; the longitudinal dimension of camera 106 sensor may be oriented at 60° with respect to the longitudinal dimension of the camera 104 sensor. In this manner, the camera sensor configuration illustrated in FIG. 1A, may provide for 420° angular coverage in the vertical and/or horizontal planes. Overlap between multiple fields of view of adjacent cameras may provide for an improved alignment and/or stitching of multiple source images to produce, for example, a panoramic image, particularly when source images may be obtained with a moving capture device (e.g., rotating camera).

Individual cameras of the apparatus 110 may include a lens, for example, lens 114 of the camera 104, lens 116 of the camera 106. In some implementations, the individual lens may be characterized by what is referred to as a fisheye pattern and produce images characterized by a fish eye (or near-fish eye) FOV. Images captured by two or more individual cameras of the apparatus 110 may be combined using "stitching" of fisheye projections of captured images to produce an equirectangular planar image, in some implementations, such as shown in U.S. patent application Ser. No. 14/949,786, incorporated supra. In some embodiments, wide-angle images captured by two or more cameras may be directly stitched in some other projection, for example, cubic or octahedron projection.

The capture apparatus 110 may house one or more internal metadata sources, for example, video, inertial measurement unit(s) or accelerometer(s), gyroscopes (e.g., for assisting in determination of attitude of the capture apparatus 110), global positioning system (GPS) receiver component(s) and/or other metadata source(s). In some implementations, the capture apparatus 110 may include a device described in detail in U.S. patent application Ser. No. 14/920,427, entitled "APPARATUS AND METHODS FOR EMBEDDING METADATA INTO VIDEO STREAM" filed on Oct. 22, 2015, incorporated supra. The capture apparatus 110 may include one or more optical elements, for example, the camera lenses 114 and 116. Individual optical elements may include, by way of non-limiting examples, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, polarized lens, other lens, and/or other optical elements.

The capture apparatus 110 may include one or more image sensors including, by way of non-limiting examples, one or more of charge-coupled device (CCD) sensor(s), active pixel sensor(s) (APS), complementary metal-oxide-semiconductor (CMOS) sensor(s), N-type metal-oxide-semiconductor (NMOS) sensor(s), and/or other image sensor(s). The capture apparatus 110 may include one or more microphones configured to provide audio information that may be associated with images being acquired by the image sensor (e.g., audio obtained contemporaneously with the captured images).

The capture apparatus 110 may be interfaced to an external metadata source 124 (e.g., GPS receiver, cycling computer, metadata puck, and/or other device configured to provide information related to system 100 and/or its environment) via a remote link 126. The capture apparatus 110 may interface to an external user interface device 120 via the link 118. In some implementations, the device 120 may correspond to a smartphone, a tablet computer, a phablet, a smart watch, a portable computer, and/or other device configured to receive user input and communicate information with the camera capture device 110. In some implementations, the capture apparatus 110 may be configured to provide panoramic content (or portions thereof) to the device 120 for viewing.

In one or more implementations, individual links 126, 118 may utilize any practical wireless interface configuration, for example, Wi-Fi, Bluetooth (BT), cellular data link, ZigBee, Near Field Communications (NFC) link, for example, using ISO/IEC 14443 protocol, IEEE Std. 802.15, 6LowPAN, Z-Wave, ANT+ link, and/or other wireless communications link. In some implementations, individual links 126, 118 may be effectuated using a wired interface, for example, HDMI, USB, digital video interface, DisplayPort interface (e.g., digital display interface developed by the Video Electronics Standards Association (VESA), Ethernet, Thunderbolt), and/or other interface.

In some implementations (not shown), one or more external metadata devices may interface to the apparatus 110 via a wired link, for example, HDMI, USB, coaxial audio, and/or other interface. In one or more implementations, the capture apparatus 110 may house one or more sensors (e.g., GPS, pressure, temperature, accelerometer, heart rate, and/or other sensors). The metadata obtained by the capture apparatus 110 may be incorporated into the combined multimedia stream using any applicable methodologies including those described in U.S. patent application Ser. No. 14/920,427 entitled "APPARATUS AND METHODS FOR EMBEDDING METADATA INTO VIDEO STREAM" filed on Oct. 22, 2015, incorporated supra.

The user interface device 120 may operate a software application (e.g., Quik Desktop, GoPro App, Fusion Studio and/or other application(s)) configured to perform a variety of operations related to camera configuration, control of video acquisition, post-processing of captured content and/or display of images or video captured by the camera apparatus 110. An application (e.g., GoPro App) may enable a user to create short video clips and share clips to a cloud service (e.g., Instagram, Facebook, YouTube, Dropbox); perform full remote control of camera 110 functions; live preview video being captured for shot framing; mark key moments while recording with HiLight Tag; View HiLight Tags in GoPro Camera Roll for location and/or playback of video highlights; wirelessly control camera software; and/or perform other functions. Various methodologies may be utilized for configuring the camera apparatus 110 and/or displaying the captured information, including those described in U.S. Pat. No. 8,606,073, entitled "BROADCAST MANAGEMENT SYSTEM", issued Dec. 10, 2013, the foregoing being incorporated herein by reference in its entirety.

By way of an illustration, the device 120 may receive user setting characterizing image resolution (e.g., 3840 pixels by 2160 pixels), frame rate (e.g., 60 frames per second (fps)), and/or other settings (e.g., location) related to the relevant context, such as an activity (e.g., mountain biking) being captured. The user interface device 120 may communicate the settings to the camera apparatus 110.

A user may utilize the device 120 to view content acquired by the capture apparatus 110. The display on the device 120 may act as a viewport into the 3D space of the panoramic content that is captured. In some implementations, the user interface device 120 may communicate additional information (metadata) to the camera apparatus 110. By way of an illustration, the device 120 may provide orientation of the device 120 with respect to a given coordinate system, to the apparatus 110 to enable determination of a viewport location and/or dimensions for viewing of a portion of the panoramic content. For example, a user may rotate (sweep) the device 120 through an arc in space (as illustrated by arrow 128 in FIG. 1A). The device 120 may communicate display orientation information to the capture apparatus 110. The capture apparatus 110 may provide an encoded bitstream configured to enable viewing of a portion of the panoramic content corresponding to a portion of the environment of the display location as it traverses the path 128.

The capture apparatus 110 may include a display configured to provide information related to camera operation mode (e.g., image resolution, frame rate, capture mode (sensor, video, photo)), connection status (connected, wireless, wired connection), power mode (e.g., standby, sensor mode, video mode), information related to metadata sources (e.g., heart rate, GPS), and/or other information. The capture apparatus 110 may include a user interface component (e.g., one or more buttons) configured to enable user to start, stop, pause, resume sensor and/or content capture. User commands may be encoded using a variety of approaches including but not limited to duration of button press (pulse width modulation), number of button presses (pulse code modulation), and/or a combination thereof. By way of an illustration, two short button presses may initiate sensor metadata and/or video capture mode described in detail elsewhere; a single short button press may be used to (i) communicate initiation of video and/or photo capture and cessation of video and/or photo capture (toggle mode), or (ii) video and/or photo capture for a given time duration or number of frames (burst capture).

It will be recognized by those skilled in the art that various user command communication implementations may be realized using, for example, short/long button presses and the like. In some implementations, the capture apparatus 110 may implement an orientation-based user interface such as that described in, for example, co-owned U.S. patent application Ser. No. 15/945,596 filed Apr. 4, 2018 and entitled "Methods and Apparatus for Implementation of an Orientation-Based User Interface", the contents of which being incorporated herein by reference in its entirety. Such orientation-based user interfaces may be particularly useful where space is limited and/or where more traditional user interfaces are not desirable.

Motion Blurring Methodologies—

As alluded to in other parts of this disclosure, traditional post-processing techniques to add motion blur is computationally expensive as it requires, for example, multiple pixel-by-pixel computations of optical flow to determine which pixels should be blurred. This is especially true of wider FOV (e.g., 360°) content due in large part to the volume of data captured and the amount of pixels associated therewith.

Figure 2A:
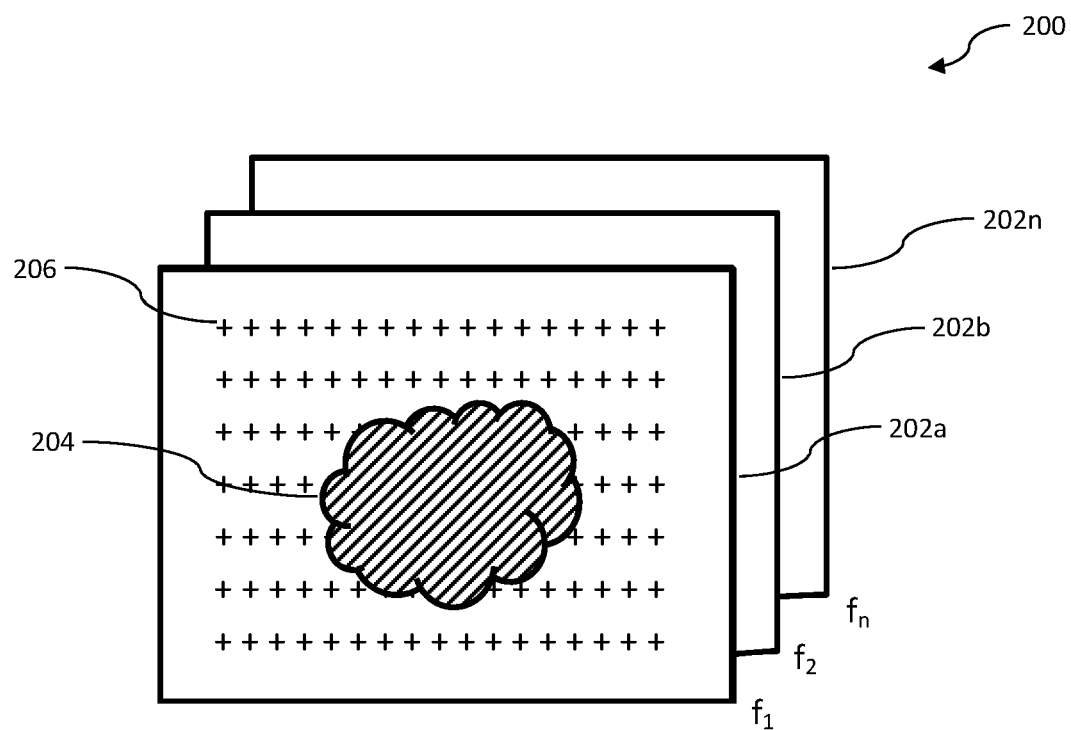
FIG. 2A is a graphical representation that illustrates an averaging filter motion blurring process, in accordance with the principles of the present disclosure.

Referring now to FIG. 2A, a graphical representation that illustrates an averaging filter motion blurring process 200 is shown and described in detail. The motion blurring process 200 takes as input two (or more) frames 202 of captured video content. As depicted, the motion blurring process 200 may take as input, a number of frames of captured video content (e.g., frame 202*a*, frame 202*b*, and frame 202*n*). However, it is appreciated that fewer frames (e.g., two (2)), or more frames (e.g., four (4) or more) may be readily substituted with equal success. In some implementations, the frames 202 utilized for the motion blurring process 200 may reside sequentially in time. For example, consider a sequence of frames 200 captured at sixty (60) frames per second. The frames 202 utilized as input may be taken sequentially at, for example, $t_0$, $t_1$, and $t_2$, where the sequence of frames over a second of time may range from $t_0$ to $t_{59}$. As but another example, the frames may be periodically taken as input, but may not be sequential in order, and thus may include, for example, frames taken at times $t_0$, $t_{29}$, and $t_{59}$, again where the sequence of frames captured over a second of time may range from $t_0$ to $t_{59}$. As but yet another non-limiting example, the sequence of frames taken as input may be taken non-periodically and non-sequentially. For example, frames may be taken at times $t_0$, $t_{20}$, and $t_{48}$, again where the sequence of frames captured over a second of time may range from $t_0$ to $t_{59}$. Other periodic (or non-periodic) intervals, other frame rates and/or other numbers of frames may be taken as input as would be readily understood by one of ordinary skill given the contents of the present disclosure, the foregoing examples merely being exemplary.

Within each of the frames 202 that are utilized as input, object segmentation may be performed. For example, one or more foreground objects 204 may be segmented from one or more background objects 206. The use of object segmentation in, for example, foreground/background segmentation is described in, for example, co-owned U.S. patent application Ser. No. 15/270,971 filed Sep. 20, 2016 and entitled "Apparatus and Methods for Video Image Post-Processing for Segmentation-Based Interpolation", the contents of which are incorporated herein by reference in its entirety. Once these objects have been segmented into respective foreground/background objects, motion blur may be applied. For example, motion blur may be applied to the background object(s), while no motion blur may be applied to the foreground object(s). Such a blurring technique may utilized to provide a more natural look and feel when capturing, for example, a race car traversing a track with a panoramic image capture device. Conversely, motion blur may be applied to the foreground object(s), while no motion blur may be applied to the background object(s). While the aforementioned foreground/background segmentation may be utilized as the basis for the application of motion blur, other schema(s) are also envisioned.

For example, the determination of whether or not to apply motion blur may be designated spatially. For example, consider a frame 202 that has been captured at a given image resolution (e.g., 3840 pixels by 2160 pixels). A center portion of the frame (e.g., 1000 pixels by 500 pixels) may not have motion blurring performed, while other portions of the frame may have motion blurring applied, or vice versa. These and other variants would be readily apparent to one of ordinary skill given the contents of the present disclosure. The determination of whether or not to apply motion blur may further be made based on the pixel values as well. For example, consider a typical 8-bit RGB integer value color scheme, where each of the red, green and blue integer values may range from a value of zero (0) to a value of two hundred fifty-five (255). Pixel values within a designated range may be blurred, while pixel values outside of the designated range may not be blurred. Combinations of the foregoing techniques may also be used in some implementations. For example, a two-factor method of determining whether or not a given pixel should be blurred may be implemented. This two-factor method may take into consideration a pixel's location (e.g., towards an edge of a given frame) as well as, for example, a pixel's RGB integer value. If both criteria are met, the pixel may be blurred; however, if both criteria are not met, the pixel may not be blurred and vice versa.

Once the areas designated for blurring have been determined (e.g., background pixels are to be blurred), blurring may be applied. The blurring may occur as a result of processing the pixel values through an averaging filter. For example, a given pixel location (e.g., at coordinates {x,y} within a plurality of frames) may have its color value averaged over a given set of frames. These color values may be the aforementioned RGB color values, may be luminance-chrominance values (e.g., YCbCr), may be a hue, saturation, lightness (HSL) or hue, saturation, value (HSV) values, or literally any other color model representation for the modeling of color within, for example, a display. Once these color values have been averaged, the averaged color value may be reinserted into a given frame in order to achieve image blur. Herein lies one salient advantage of the present disclosure over prior blurring techniques such as the aforementioned multiple pixel-by-pixel computations of optical flow. Namely, the application of blurring to portions of an image (or frame) that is less computationally intensive than prior image blurring techniques. Such an image blurring technique may be readily applied to, for example, captured panoramic content rendered on computing devices such as, for example, a portable computing device (e.g., a user's smartphone).

Figure 2B:
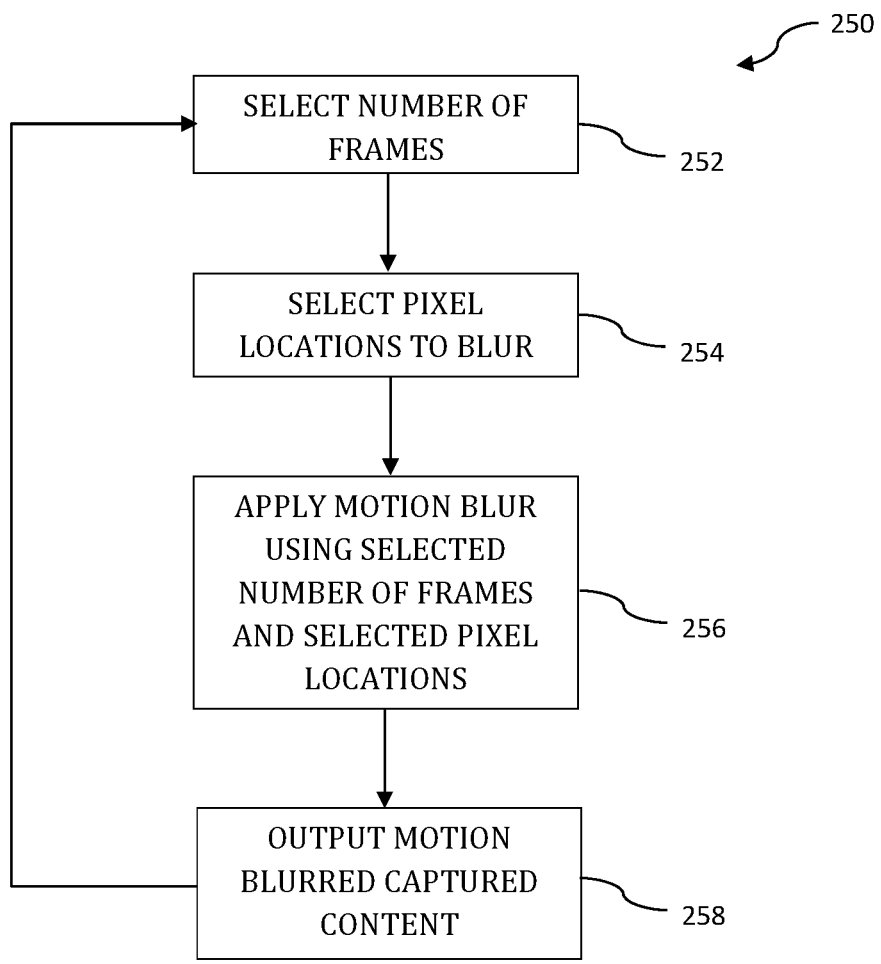
FIG. 2B is a logical flow diagram illustrating one exemplary implementation of a method for outputting motion blurred captured content, in accordance with the principles of the present disclosure.

Referring now to FIG. 2B, an exemplary methodology 250 for the output of motion blurred captured content is shown and described in detail. At operation 252, a number of frames is selected for the application of motion blur to a given frame of captured content. For example, two or more frames may be selected in order to apply motion blur to the given frame of captured content. The number of frames selected may be correlated with the amount of motion blur to be applied. For example, choosing a larger number of frames may be correlated with a higher degree of motion blur as compared with choosing a smaller number of frames. However, in some implementations, the degree of motion blur may be more closely correlated with the variation of pixel values at a given location within a set of frames. For example, where the color values for a given pixel location over a number of frames has a larger disparity in value, a smaller number of frames may be selected in order to apply a given amount of motion blur. However, where the color values for a given pixel location over a number of frames has a smaller disparity in value, a larger number of frames may need to be selected in order to apply that given amount of motion blur.

At operation 254, the pixel locations to blur are selected. For example, these pixel locations may be based on the aforementioned foreground/background segmentation. In some variants, spatial considerations and/or color value considerations may also be utilized in addition to, or alternatively from, the aforementioned foreground/background segmentation. Notably, the arranged order of operation 252 and 254 may not be as depicted. In other words, in some implementations it may be desirable to implement operation 254 prior to implementing operation 252 and vice versa.

At operation 256, the motion blur is applied to the selected locations using the selected number of frames. For example, the motion blur applied may utilize a relatively straightforward averaging filter function. The function for averaging pixels over multiple frames is illustrated by Equation (1) below:

$$P(x, y) = \frac{f_1(x, y) + f_2(x, y) + f_3(x, y) \ldots}{N_f} \quad \text{Equation (1)}$$

In other words, the motion blur applied (i.e., P(x,y)) equals the summation of the pixel color values at a given location within a plurality of frames, divided by the total number of frames selected (i.e., Nf). Such a low complexity formula greatly reduces the computational complexity for applying motion blur during, for example, image post-processing.

At operation 258, the post-processed blurred captured content is output where it may be displayed. Subsequent to the output of the post-processed blurred captured content, the number of frames to utilize for the application of motion blur and/or the pixel locations to blur may be re-selected and the motion blur may be re-applied. For example, enabling a user to re-apply motion blur subsequent to the output of motion blurred captured content may allow a user to "fine-tune" the image to be displayed in order to give the user real-time feedback. Some variants may include pre-determined types of "activity filters" as is described elsewhere herein. For example, rather than having a user select the number of frames at operation 252, a user may instead select a pre-selected "action" activity filter. This action activity filter may automatically select the number of frames in order to provide a relatively high amount of blurring. Such a variant may be useful for a user when post-processing, for example, panoramic content captured while base jumping, etc. Other activity filters may be provided for other types of common activities including, for example, the capturing of a golfer swinging a club. Ideally, such pre-selected activity filters may be optimized for the types of content being captured. These and other variants would be readily understood by one of ordinary skill given the contents of the present disclosure.

Virtualized Neutral Density Filters and Associated Methodologies—

"Judder" and "the Soap Opera Effect" are screen artifacts that occur when content is presented on a device with a refresh rate that corresponds to a frame rate that is relatively higher than the frame rate the content was captured at.

For example, consider content that is captured at 24 frames per second (fps) (which is the standard frame rate for filming). Older LCD televisions use panels having a 60 Hz refresh rate, while more modern LCD TV's use panels having 120 Hz refresh rate. A 60 Hz television may present content at 60 fps. In order to present the content captured at 24 fps, software in the 60 Hz TV detects the incoming film rate and inserts the missing 36 frames by repeating frames. Additionally, to ensure that there will consistently be 60 frames per second, a 3:2 pulldown may be used. In other words, the first frame is displayed on the TV screen three times while a subsequent frame is displayed two times, and so on and so forth throughout the display of the captured content. A consequence of this repeating of frames may result in so-called "judder". Judder is characterized by "jerkiness", or a jerky movement of a scene that is displayed on, for example, a television screen. For example, consider an image capture device that captures a scene at a given frame rate (e.g., 24 fps). As the image capture device pans quickly within the scene, the motion interpolation of, for example, the 3:2 pulldown on the TV cannot keep up, thereby causing the display of uneven (choppy) images. It may also occur when the image capture device pans slowly and the TV processing cannot smooth out the "rough edges."

To reduce these judder artifacts, software has been introduced that utilizes motion interpolation (also known as "motion smoothing") to reduce these judder artifacts. Motion smoothing is a way to prevent excessive motion blurring by inserting images in between the frames that are actually captured, thereby giving the impression of a higher frame rate as compared with the actual frame rate at image capture. This process may include using "frame interpolation," which refers to a process of creating new images based on an analysis of two or more captured frames and extrapolating (or "digitally guessing") what the missing images would theoretically look like. However, while motion smoothing is generally acceptable for content captured at, for example, 24 fps, content captured at a higher frame rates (such as images captured using a panoramic image capture device that captures, e.g., a 360° extent of space), can look "unnatural," or look "too real." This "unnatural" or "too real" effect is commonly referred to as the "Soap Opera Effect." Essentially, frame interpolation interrupts the cadence of the film as it is literally inserting "fake" frames and removes the judder between frames that viewers expect to see.

Accordingly, aspects of the present disclosure introduce post-processing "virtualized neutral density filters" to simulate the cinematic effects associated with moving, for example, a 24 fps camera at a fixed light exposure and focal length (e.g., the effects that moving a trundle cam would actually experience), even when the image capture device is stationary through the use of, for example, a panoramic (e.g., 360°) image capture device. In other words, a "pan" occurs within captured panoramic content by panning the display port through the extent of the captured panoramic scene. However, such virtualized pans may appear unnatural to a viewer of the captured content, as the panoramic image capture device is not actually moving when this "pan" is captured. Such cinematic effects include blur (i.e., emulating low frame rate and underexposure), discussed supra, and out-of-focus effects (i.e., emulating an incorrect match of focal length to the field of view).

Figure 3:
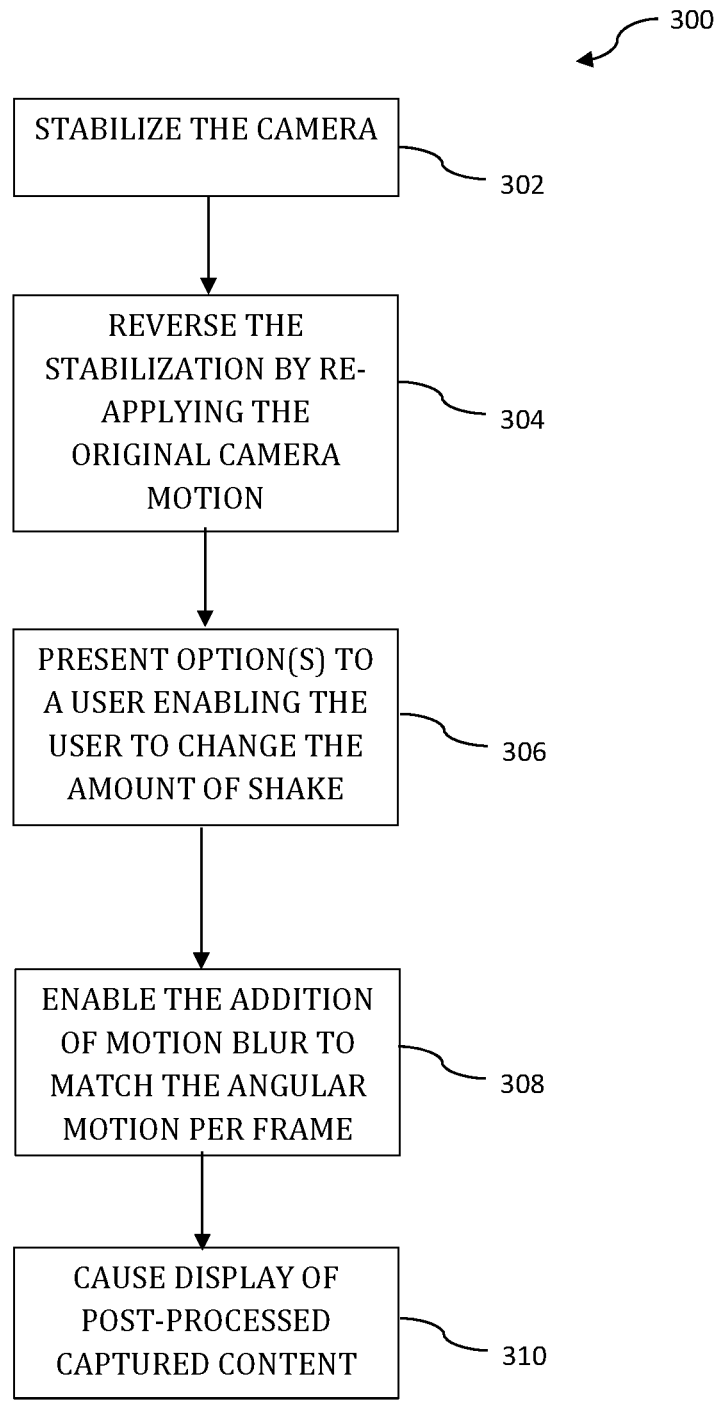
FIG. 3 is a logical flow diagram illustrating one exemplary implementation of a method for enabling the addition of motion blur, in accordance with the principles of the present disclosure.

FIG. 3 illustrates a methodology 300 for the virtualized neutral density filter processing and display of captured wider FOV content. At operation 302, the camera is stabilized. For example, with captured wider FOV content, a user may wish to look at a subset of the captured wider FOV content (e.g., a viewport). This viewport may be stabilized at operation 302. In one variant, the stabilization includes full direction-locked stabilization as if only viewing from a single direction.

At operation 304, the stabilization is reversed by re-applying the original camera motion. This might introduce shaky, juddery camera motion, as though the camera was not stabilized; however, rolling shutter artifacts are substantially eliminated via the stabilizing and reversal of the stabilizing steps.

At operation 306, the user can be presented with one or more options to adjust the amount of judder introduced. Additionally, per operation 308, reversing the stabilization after being stabilized initially allows the motion blur path to be determined, and therefore the user can be provided the option to add motion blur to precisely match the angular motion per frame. In some implementations, the angular motion refers to the motion of the viewport within the extent of the captured panoramic content. The angular motion may also refer to the physical motion of the image capture device itself, in addition to, or alternatively than, the motion of the viewport. In some variants, the motion blur can be added per the processes described elsewhere herein. At operation 310, the post-processed captured content is displayed, or caused to be displayed, to the user who captured or edited the content, or to other users for which the user wishes to share this post-processed content with.

Post-Processing Methodologies—

Figure 4:
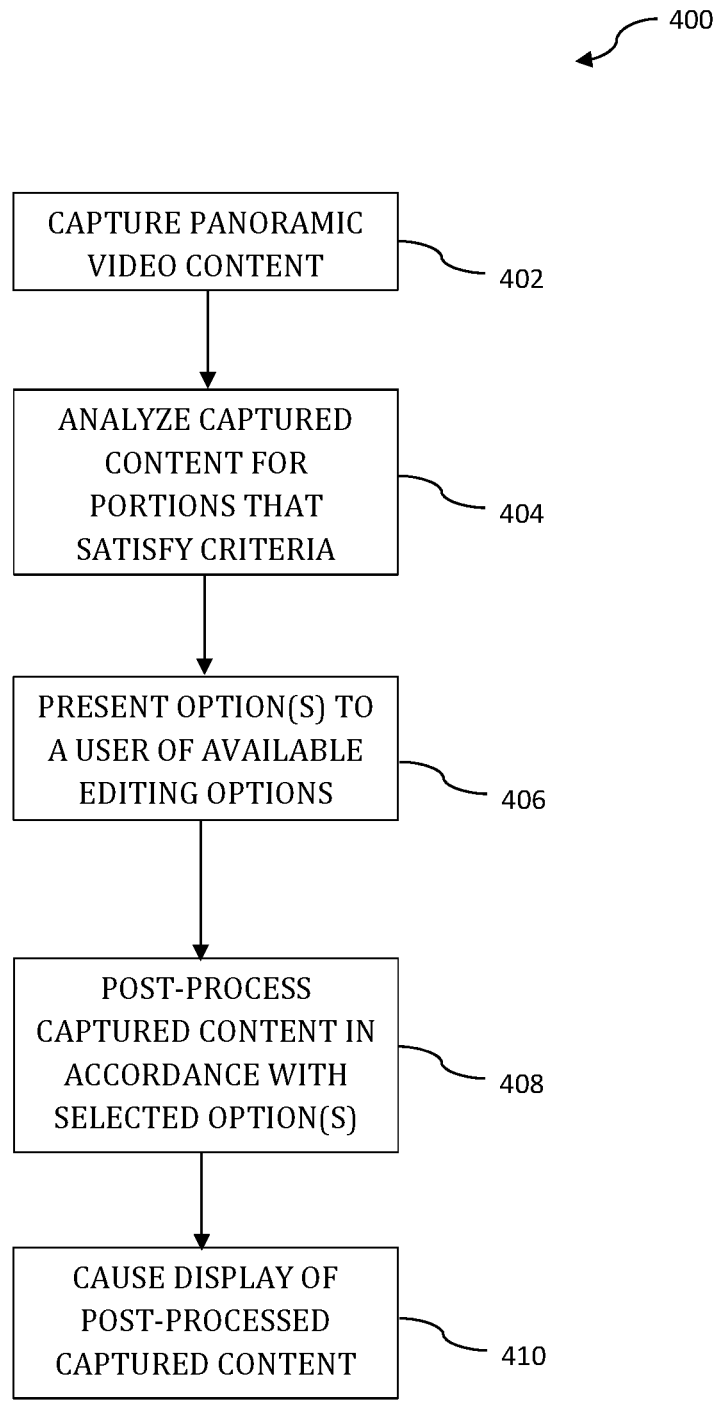
FIG. 4 is a logical flow diagram illustrating one exemplary implementation of a method for causing the display of post-processed captured content, such as content captured using the systems of FIGS. 1A-1B, in accordance with the principles of the present disclosure.

FIG. 4 illustrates one such methodology 400 for the processing and addition of motion blur to captured wider FOV content. At operation 402, panoramic video content is captured and/or transmitted/received. In some implementations, the panoramic video content may be captured using the capture apparatus 110 illustrated in FIG. 1A, or may be captured using the capture apparatus 150 illustrated in FIG. 1B. For example, with reference to FIG. 1A, the captured content would be collectively characterized by the respective FOVs of individual ones of the six cameras contained thereon that are to be later stitched in order to produce, for example, a 360° panoramic. In some implementations, panoramic video content is captured using an image capture device 150 with two cameras such as that shown in FIG. 1B. For example, the Fusion image capture device manufactured by the Assignee hereof. In yet other variants, the panoramic video content may be captured by two or more image capture devices, with the collective captured content from these two or more image capture devices being input into, for example, a computing system, such as computing system 700 described with respect to FIG. 7. These and other variants would be readily apparent to one of ordinary skill given the contents of the present disclosure.

At operation 404, the captured content is analyzed for portions that satisfy a certain criteria. In some implementations, the captured content may be analyzed using the aforementioned "activity filters" which may characterize certain types of activities. For example, with an activity that has a high degree of relative motion with respect to foreground/background objects (e.g., base jumping), a "high activity" filter might be used that would present a user with an option to include a relatively high amount of blur for the background objects. Conversely, with an activity that has a relatively low degree of relative motion with respect to foreground/background objects (e.g., a golfer driving a golf ball), a "low activity" filter might be used that would present a user with the option to include a relatively low amount of blurring. Various gradations of "activity filters" may be utilized as well. Such gradations may take into consideration, for example, the size of the foreground object(s) as compared with the background objects within a displayed scene (e.g., a viewport); the relative motion (and/or velocity) between the foreground/background objects; and/or user selected options for the captured scene (e.g., "high activity", "low activity", intermediate gradations of activity, lighting conditions, various cinematic effects, etc.).

In some implementations, the captured content is analyzed for portions that satisfy certain cinematic criteria, such as those described in co-owned and co-pending U.S. patent application Ser. No. 16/107,422 filed on Aug. 21, 2018, and entitled "METHODS AND APPARATUS FOR OVERCAPTURE STORYTELLING", previously incorporated herein by reference in its entirety. For example, the captured content may be analyzed for portions of content captured in low light conditions, brighter conditions (e.g., full bright daylight), and in other lighting conditions lying between the aforementioned low light conditions and brighter conditions. In some implementations, the captured content may be analyzed for object movement as compared with, for example, the background scene. Such analysis of the content can be used to select and/or recommend a viewport for a user, as well as to determine options to present to a user, such as available cinematic styles or effects, including the addition of motion blur. For example, the analysis may provide an option for averaging pixel values using the techniques described with respect to FIGS. 2A and 2B over multiple frames using low complexity averaging filters as is described elsewhere herein. The content with motion blur may be presented to a user with options and/or tools to enable the user to adjust the motion blur effect.

As previously alluded to, traditional post-processing content to add motion blur is computationally expensive, as it typically requires multiple pixel-by-pixel computations of optical flow to determine which pixels should be blurred. This is especially true of wider FOV (e.g., 360°) content due in large part to the volume of data captured and the large amount of pixels contained therein. Using low complexity averaging filters for averaging pixels over multiple frames, as opposed to using optical flow, provides solutions to this problem when adding motion blur to the captured content. However, even before the motion blur is applied, post-processing such a large amount of data is also computationally expensive. Accordingly, in some implementations, the analysis of the captured content may be performed by analyzing captured content metadata. For example, this analysis may be performed at the time of content capture. Herein lies one salient advantage of the present disclosure, in some implementations. Namely, as the analysis of the captured content may only occur with respect to the captured content metadata, analysis of the captured content metadata can be far less bandwidth intensive, and less computationally expensive, as compared with analysis of the captured imaging content itself. Examples of generated metadata may include the aforementioned lighting conditions at the time of capture, object movement, object recognition, facial recognition, high contrast captured content, color palette metadata, direction metadata, and literally any other type of useful metadata.

In some implementations, various types of metadata may be tightly coupled with one another. For example, the direction metadata may be associated with an identified object (e.g., object recognition), or an identified face (e.g., facial recognition). Accordingly, in such an implementation, the direction metadata may include spatial and temporal coordinates associated with the identified object or the identified face within the captured content. For example, the metadata may include an identified object and/or an identified face (e.g., a person named Frank). Accordingly, the generated metadata may not only identify the individual of interest (i.e., Frank), but may further include spatial and temporal coordinates when the individual Frank has been captured by the image capture device. Additionally, direction metadata may include the motion of the camera itself. This camera motion direction metadata may be generated using, for example, GPS sensor data from the image capture device itself (e.g., for spatial/temporal positioning), one or more on-board accelerometers, one or more gyroscope sensors (e.g., for determination of camera attitude), and/or other sensor data for generating camera motion direction metadata. This camera motion direction metadata may be utilized for the presentation of motion blurring options. These and other variations would be readily apparent to one of ordinary skill given the contents of the present disclosure.

At operation 406, one or more editing options are presented to a user, which may or may not be based on the analysis at operation 404. In some implementations, the one or more options relate to available cinematic styles, such as those described in co-owned and co-pending U.S. patent application Ser. No. 16/107,422 filed on Aug. 21, 2018, and entitled "METHODS AND APPARATUS FOR OVERCAPTURE STORYTELLING", previously incorporated herein by reference in its entirety. For example, the user may be presented options relating to camera tilts, pans and/or tracking, including a so-called dolly pan (i.e., motion that is orthogonal to the direction of movement for the image capture device), a so-called dolly zoom (i.e., motion that is inline to the direction of movement for the image capture device), and/or a whip pan (i.e., a type of pan shot in which a camera pans so quickly that the picture blurs into indistinct streaks).

As but one non-limiting example, panning on a racecar as it travels around a track (e.g., through the use of viewports into the extent of the panoramic content), may look unnatural due to the relative speed of the racecar as compared with the background—i.e., both the background and the racecar would appear to be unnaturally in focus. Accordingly, an option to perform object segmentation during a pan may be presented to a user. The use of object segmentation is described in, for example, co-owned U.S. patent application Ser. No. 15/270,971 filed Sep. 20, 2016 and entitled "Apparatus and Methods for Video Image Post-Processing for Segmentation-Based Interpolation", the contents of which are incorporated herein by reference in its entirety. In such a usage scenario, the object of interest may be segmented from the background scene. The background scene may then have a blurring technique applied to it (e.g., the techniques described with reference to FIGS. 2A-3), while the object of interest remains in focus. Accordingly, this object segmentation technique during pans (such as those under brighter conditions) may present a more natural feel to the post-processed content resulting in a more natural (visually appealing) cinematic appearance.

In some implementations, at least one tool is provided that enables the user to identify, select, and/or edit segmented portions of the captured content. In other implementations, the post-processing software automatically identifies portions of the captured content to suggest to the user for segmenting and provides at least one tool (such as a tool similar to the magic wand tool in Photoshop®) that enables the user to change the boundaries of the automatically identified portions. In this implementation, a plurality of versions of the captured content can be suggested to the user, where each version has different portions automatically indicated for segmenting. The user may then select at least one of the versions to modify by using the aforementioned tool(s). In yet other implementations, no automated segmentation is performed, and instead user input is solely relied upon to determine the portions of the content to segment.

In some implementations, the options for segmenting may be based at least in part on the aforementioned analysis of the captured content during operation 404. For example, the aforementioned facial recognition algorithms may be applied in order to differentiate portions to segment. Consider a scenario where an individual wants their identity to remain anonymous—portions of the captured content can be masked/segmented such that the individual's face or other recognizable features can be blurred, or otherwise obfuscated. Other implementations for segmenting include rendering a mask to a separate texture or to the alpha channel of the color buffer. These and other segmenting or masking techniques may be readily understood and mimicked by one of ordinary skill given the contents of the present disclosure.

In some implementations, this presentation of options to a user of available editing options, including motion blur, may be done entirely with the aforementioned generated metadata. In other words, rather than having to transfer and/or analyze the entirety of the captured content, only the generated metadata will need to be analyzed and transferred. Such an ability to generate and create more "natural" content in a way that takes fewer processing resources, is less bandwidth intensive, and involves less computation time may be advantageous. This may be particularly useful in the context of captured panoramic content due to the relatively large size of this captured panoramic content as well as the computationally expensive nature of stitching for this captured panoramic content. In the context of image stitching for panoramic capture, it may be possible to obviate the need to stitch for shots that are selected within the purview of a single image capture lens. Additionally, stitching computations may be performed only on captured content where the nature of the shot requires the use of two (or more) image capture lenses.

For example, video (and audio) scene analysis may require that all of the captured content be uncompressed. In many instances, the image capture device may inherently have to compress the captured content in order to, inter alia, reduce the data rate for transfer. However, the captured content will be uncompressed at the time of capture (i.e., will include the data from the sensors directly) and the generation of metadata may be performed prior to the captured content being compressed for storage.

Accordingly, the presentation of option(s) to a user of available editing options may be performed with significantly less data needing to be transferred off the image capture device. For example, the transfer of metadata for the presentation of options at operation 406 may be less than 0.1% of the size of the captured content itself. Accordingly, cinematic edit decisions can be generated and the needed segments are extracted from the captured video and audio in a manner that is much smaller in size and less computationally intensive than if the entirety of the captured content had to be transferred.

In some implementations, the presentation of option(s) to a user of available editing options, including motion blur, at operation 406 may be obviated altogether. In other words, the analysis of the captured content at operation 404, and the post-processing of the captured content at operation 408 as is described infra, may be performed without user input (contemporaneously or otherwise). For example, the post-processing software may make editing decisions (e.g., through received metadata and/or captured content) without contemporaneous user input at the time of post-processing. In some implementations, these decision-less suggestions may be based on preset user preferences that may be, for example, content independent. For example, preset user preferences may include such items as always include faces in my post-processed content, or always give me faces for particular individuals (e.g., my children) in my post-processed content. Other examples may include setting a user preference for high acceleration moments, low acceleration moments, low-light conditions, bright-light conditions, or literally any other types of user preferences that may be tracked using the aforementioned different metadata types. Additionally, a user preference may include a particular song, album, artist, genre, etc. to include with my content. In some implementations, it may be desirable to make decision-less suggestions based on preset user preferences that are content dependent. In other words, dependent upon the type of content captured (e.g., capturing of content of an outdoor scene), preset user choices may be selected.

These preset user choices may include, in some implementations, pre-determined types of "activity filters" which characterized certain types of activities. For example, with an activity that has high relative motion, such as base jumping, a base jumping filter might be used that would include high blur; conversely, for an activity with low relative motion, such as golfing, the pre-processed golfing filter would have low blur. Additionally, in some implementations, it may be desirable to modify a user's automated post-processing decisions over time through, for example, the implementation of machine learning algorithms. These and other variants would be readily apparent to one of ordinary skill given the contents of the present disclosure.

At operation 408, the captured panoramic video content may be post-processed in accordance with, for example, the selected option(s). For example, various one(s) of the aforementioned techniques may be selected such that the post-processed captured content may provide for a more "natural" composition, thereby enabling a user of, for example, the aforementioned GoPro Fusion camera to create more visually appealing content, without necessitating that a user be necessarily aware of the techniques that underlie their creation, or necessarily require that all of the captured content be transferred. In a sense, unsophisticated or unknowledgeable users may be able to create visually interesting/appealing content purely by "over-capturing" a scene and editing this content in accordance with the presented editing options, such as motion blur, presented at operation 406 and/or previously input user preferences and the like. At operation 410, the post-processed captured content is displayed, or caused to be displayed, to the user who captured or edited the content, or to other users for which the user wishes to share this post-processed content with.

Figure 5:
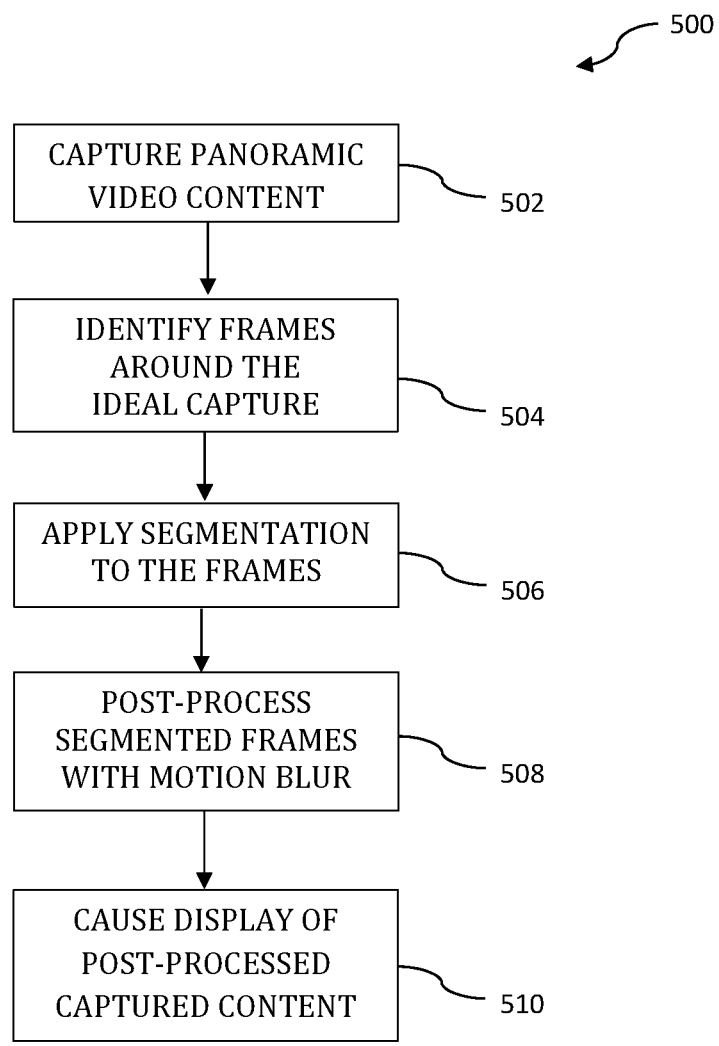
FIG. 5 is a logical flow diagram illustrating another exemplary implementation of a method for causing the display of post-processed captured content, such as content captured using the systems of FIGS. 1A-1B, in accordance with the principles of the present disclosure.

FIG. 5 illustrates another such methodology 500 for the processing and display of captured wider FOV content. In some aspects, methodology 500 can be completely automated, such that no user input is used. At operation 502, panoramic video content is captured and/or transmitted/received. In some implementations, the panoramic video content may be captured using the capture apparatus 110 illustrated in FIG. 1A or the capture apparatus 150 illustrated in FIG. 1B, etc. For example, in the context of the capture apparatus 110 of FIG. 1A, the captured content would be collectively characterized by the FOV of individual ones of the six cameras contained thereon that are to be later stitched in order to produce, for example, a 360° panoramic. In some implementations, panoramic video content is captured using an image capture device (150, FIG. 1B) with two cameras such as, for example, the Fusion image capture device manufactured by the Assignee hereof. In yet other variants, the panoramic video content may be captured by two or more image capture devices, with the collective captured content from these two or more image capture devices being input into, for example, a computing system, such as computing system 700 described with respect to FIG. 7. In some implementations, only the metadata is transferred to the computing system 700 prior to the post-processing of this captured content at operation 508. These and other variants would be readily apparent to one of ordinary skill given the contents of the present disclosure.

At operation 504, a number of frames are identified and taken from around the ideal capture (e.g., the bicyclist crossing the line). In one embodiment, the frames consist of, or at least include, a number of viewport frames (i.e., the video frames that the user has cropped and curated from the 360° raw material). In another embodiment, frames are selected via use of one or more algorithms executed by the post-processing software to identify or verify one or more objects and/or individuals in the captured content. In some implementations, facial recognition algorithms can be applied such that selected salient facial features (e.g., the relative position and/or size of the eyes, nose, cheekbones, and/or jaw) are then compared against a database having pre-stored facial characteristics stored therein. The recognition algorithms may include one or more of a principal component analysis using Eigenfaces, linear discriminant analysis, elastic bunch graph matching using the Fisherface algorithm, hidden Markov models, multilinear subspace learning using tensor representation and/or the neuronal motivated dynamic link matching. In some variants, the software may only be used to determine the presence of a face without requiring a comparison against known faces in a database. In some implementations, the results (or portions thereof) of this facial recognition performance are stored in metadata.

It is noted that, in some implementations, the subject of interest will be implicitly framed in manner that has little relative movement. For example, using the exemplary racing scenario discussed above, the racecar would be both centered in the viewport video and very similar (in terms of, inter alia, pixels) frame-to-frame. Conversely, the background will be implicitly framed in a manner that has a lot of relative movement. For example, using the same racecar scenario, the crowd would have a lot of relative motion—i.e., a lot of pixel differences from frame-to-frame.

At operation 506, the viewport frames are segmented into a "mask" of foreground (e.g., cyclist) and background (e.g., crowd). In some implementations, the segmenting is based on pixel differences between the frames. The foreground (e.g., the subject of interest) will be implicitly framed in manner that has little relative movement (i.e., the cyclist would be centered in the viewport video and very similar frame to frame); and the background will be implicitly framed in a manner that has a lot of relative movement (i.e., the crowd would have a lot of relative motion—a lot of pixel differences from frame to frame).

In some implementations, the segmenting can be performed automatically by the post-processing software. In other implementations, the user can be presented with a tool which enables the user to segment portions of the captured content. In yet other implementations, the segmentation can be effected by use of a hybrid approach—i.e., using both the post-processing software and input from the user. For example, the post-processing software may automatically segment, based on pixel differences between the frames, the captured content into a "mask" of the cyclist and bicycles as the foreground, and the crowd as the background. This segmented version can be presented to the user with the option and/or tools to change the segmented portions. For example, if the user desires the bicycle to be blurred, the user can then select the option to blur the bicycle and/or use the tool associated with the post-processing software to segment the cyclist from the bicycle.

Additionally, it is noted that operations 504 and 506 (i.e., the identification of the frames and segmentation process) can be parts of a single operation—i.e. collectively an analysis of the captured content (e.g., operation 404 of FIG. 4)—and can be done repeatedly in an iterative fashion. For example, a number of frames could be identified for one field of view, and a foreground and background can be segmented for those frames, but the field of view could change for a subsequent number of frames, which could change the foreground and background that are segmented.

At operation 508, the captured panoramic video content may be post-processed with motion blur (which may be done automatically or in accordance with the selected option(s) per operations 406 and 408 of FIG. 4). For example, a first portion of the captured content (e.g., an object of interest) might be "masked off" completely pursuant to segmentation process at operation 506, and therefore no blur would be applied thereto; whereas a second portion of the captured content (e.g., the background behind the object of interest), which is not "masked off," would have blur applied thereto.

Additionally, in some implementations, the amount of blurring can be scaled. For example, consider the example where there are two bicyclists in the viewport and a first cyclist is traveling faster than the second cyclist; in this example, the user might want no blur on the first cyclist, low blur on the second cyclist, and high blur on the crowd. In some implementations, the post-processing software would automatically apply this effect based at least on pixel differences between the frames. However, in some embodiments, the user can select options and/or use the tool associated with the post-processed software to apply and/or change the amount of blur to each segmented layer or object.

Additionally, as previously alluded to, traditional post-processing content to adding motion blur is computationally expensive, as it requires multiple pixel-by-pixel computations of optical flow to determine which pixels should be blurred. This is especially true of wider FOV (e.g., 360°) content due in large part to the volume of data captured. Accordingly, in some implementations, low complexity averaging filters are utilized to average details of portion of the captured content to be blurred over multiple frames (see FIGS. 2A and 2B). In other words, contrast to optical flow, pixel values are averaged over multiple frames.

At operation 510, the post-processed captured content is displayed, or caused to be displayed, to the user who captured or edited the content, or to other users for which the user wishes to share this post-processed content with.

Figure 6:
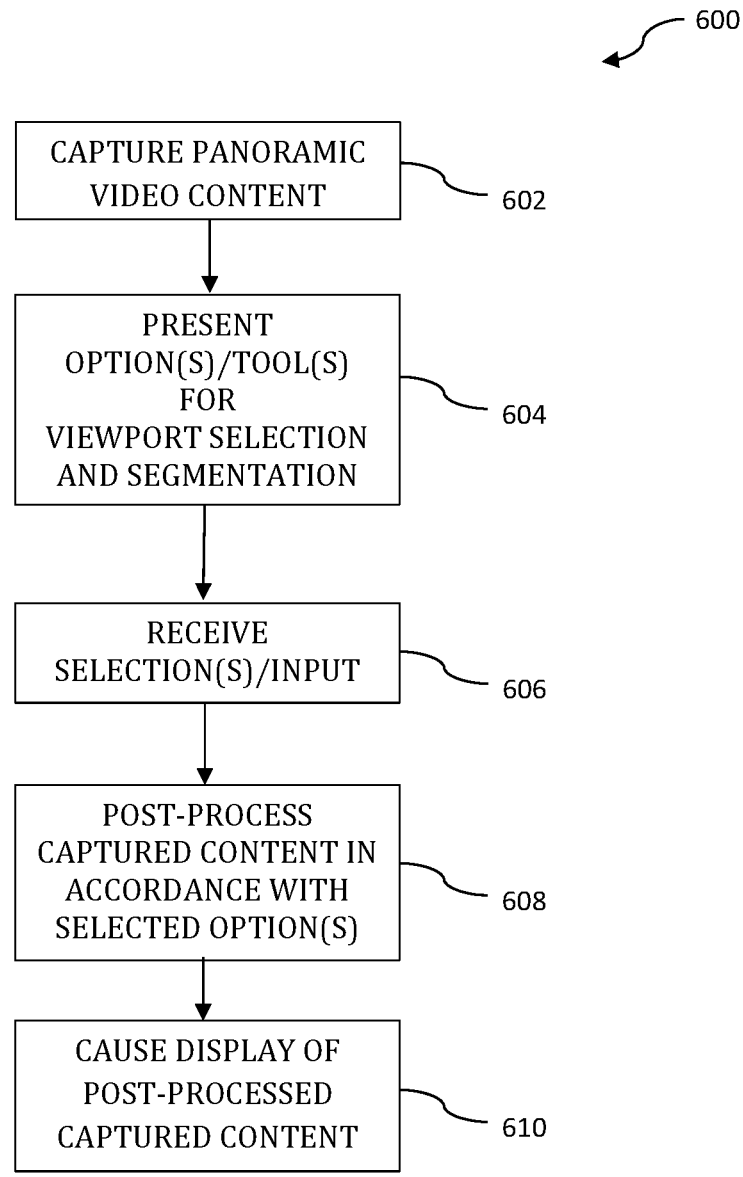
FIG. 6 is a logical flow diagram illustrating yet another exemplary implementation of a method for causing the display of post-processed captured content, such as content captured using the systems of FIGS. 1A and 1B, in accordance with the principles of the present disclosure.

FIG. 6 illustrates another such methodology 600 for the processing and display of captured wider FOV content. At operation 602, panoramic video content is captured and may be transmitted/received and/or the captured metadata associated with the captured content may be transmitted/received. In some implementations, the panoramic video content may be captured using the capture apparatus 110 illustrated in FIG. 1A, the capture apparatus 150 illustrated in FIG. 1B, etc. Additionally, the aforementioned metadata may be generated at the time of image capture. The captured content may be collectively characterized by the FOV of individual ones of the six cameras contained thereon that are to be later stitched in order to produce, for example, a 360° panoramic. In some implementations, panoramic video content is captured using an image capture device with two cameras such as, for example, the Fusion image capture device manufactured by the Assignee hereof. In yet other variants, the panoramic video content may be captured by two or more image capture devices, with the collective captured content from these two or more image capture devices being input into, for example, a computing system, such as computing system 700 described with respect to FIG. 7. These and other variants would be readily apparent to one of ordinary skill given the contents of the present disclosure.

At operation 604, differing options may be presented to a user. For example, a user may be presented with options (and/or tools, such as cropping tools) to select the frames representative of the virtualized viewport. Additionally, a user may be presented with options (and/or tools, such as a tool similar to the magic wand tool in Photoshop®) to select portions (such as objects, the background, foreground, etc.) of the captured content within the viewport frames that the user would like segmented or "masked."

In some variants, a user can be presented with options and/or tools for scaling the mask such that the motion blur for that mask can be made more or less aggressive—i.e., be more or less motion blurred (giving the impression of more or less motion). For example, the amount of blur can be a setting, such as a percentage (e.g., if 100 pixels are moving and 50 pixels are blurred, then the mask (e.g., object or segmented portion of the captured content) would be set at 50% blur).

In other variants, a user can be presented an option to set different fields of view. This may directly affect what is considered foreground and background. For example, multiple cyclists crossing the finish line may need more conservative filtering to ensure all of the cyclist are sharply caught.

In yet other variants, a user can be presented with different pre-determined types of "activity filters" which characterized certain types of activities. For example, with an activity that has high relative motion, such as base jumping, a user might select a base jumping filter that would include high blur; conversely, for an activity with low relative motion, such as golfing, the pre-processed golfing filter which would have low blur. Additionally, certain types of activities may be characterized by different subjects of interest. For example, a golfer may want to focus on his face (blurring the club motion), or sharp resolution of the club bending in motion (blurring the face). Hence, the post-processing software could present a user with options and/or tools to blur certain portions of the captured content (e.g., objects, such as a golf club), and scale the amount of blur applied to those portions. Yet additionally, a user may be presented with one or more options to render their captured content in accordance with cinematic styles, such as those described in co-owned and co-pending U.S. patent application Ser. No. 16/107,422 filed on Aug. 21, 2018, and entitled "METHODS AND APPARATUS FOR OVERCAPTURE STORYTELLING", previously incorporated herein by reference in its entirety. These and other variants would be readily apparent to one of ordinary skill given the contents of the present disclosure.

In some implementations, machine learning may be applied to adapt to a given user's previously chosen selections or preferences, or even to adapt to user preference selections given prior to content capture. For example, software may determine which selections a given user has preferred in the past and may only present options to that user in accordance with those learned preferences. In other words, such a variant enables the provision of options that are known to be preferable to that given user, thereby limiting the available number of options, thereby, for example, not overwhelming the user with numerous available options. In some implementations, a user may have the option of choosing between "learned" preferences and a more full listing of available cinematic options.

At operation 606, selections are received from a user. In some implementations, the captured content is analyzed for portions that satisfy the selected criteria. Notably, not every effect may be created given the captured content, but certain captures may allow for multiple options. Portions of the captured content may be discarded that do not satisfy the criteria selected at operation 606.

At operation 608, the captured panoramic video content may be post-processed in accordance with the selected option(s). For example, various one(s) of the aforementioned blurring techniques may be selected such that the post-processed captured content may provide for a more "natural" composition, thereby enabling a user to create more visually appealing content without necessitating a user to necessarily be aware of the techniques that underlie their creation. At operation 610, the post-processed captured content is displayed, or caused to be displayed, to the user who captured or edited the content, or to other users for which the user wishes to share this post-processed content with.

Exemplary Apparatus—

Figure 7:
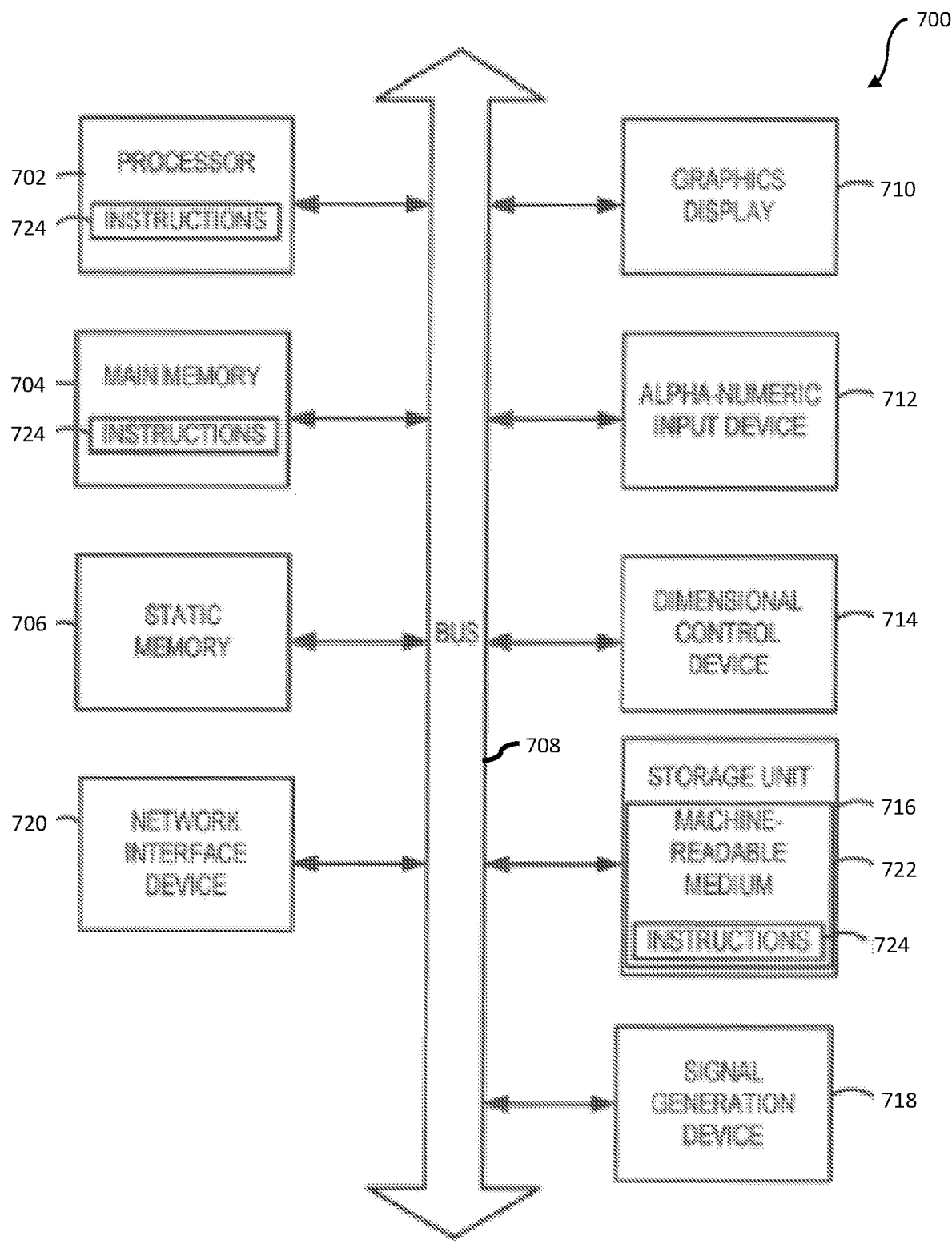
FIG. 7 is a block diagram of an exemplary implementation of a computing device, useful in performing, for example, the methodologies of FIGS. 2A-6, in accordance with the principles of the present disclosure.

FIG. 7 is a block diagram illustrating components of an example computing system 700 able to read instructions from a computer-readable medium and execute them in one or more processors (or controllers). The computing system in FIG. 7 may represent an implementation of, for example, an image/video processing device for the purpose of implementing the methodologies of, for example, FIGS. 2A-6. In some implementations, the computing system 700 may include, for example, one or more of the image capture devices depicted in FIGS. 1A and 1B.

The computing system 700 can be used to execute instructions 724 (e.g., program code or software) for causing the computing system 700 to perform any one or more of the rendering methodologies (or processes) described herein. In alternative embodiments, the computing system 700 operates as a standalone device or a connected (e.g., networked) device that connects to other computer systems. The computing system 700 may include, for example, an action camera (e.g., a camera capable of capturing, for example, a 360° FOV), a personal computer (PC), a tablet PC, a notebook computer, or other device capable of executing instructions 724 (sequential or otherwise) that specify actions to be taken. In another embodiment, the computing system 700 may include a server. In a networked deployment, the computing system 700 may operate in the capacity of a server or client in a server-client network environment, or as a peer device in a peer-to-peer (or distributed) network environment. Further, while only a single computer system 700 is illustrated, a plurality of computing systems 700 may operate to jointly execute instructions 724 to perform any one or more of the rendering methodologies discussed herein.

The example computing system 700 includes one or more processing units (generally processor apparatus 702). The processor apparatus 702 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The computing system 700 may include a main memory 704. The computing system 700 may include a storage unit 716. The processor 702, memory 704 and the storage unit 716 may communicate via a bus 708.

In addition, the computing system 700 may include a static memory 706 and a display driver 710 (e.g., to drive a plasma display panel (PDP), a liquid crystal display (LCD), a projector, or other types of displays). The computing system 700 may also include input/output devices, for example, an alphanumeric input device 712 (e.g., touch screen-based keypad or an external input device such as a keyboard), a dimensional (e.g., 2-D or 3-D) control device 714 (e.g., a touch screen or external input device such as a mouse, a trackball, a joystick, a motion sensor, or other pointing instrument), a signal capture/generation device 718 (e.g., a speaker, camera, GPS sensor, accelerometers, gyroscopes and/or microphone), and a network interface device 720, which also are configured to communicate via the bus 708.

Embodiments of the computing system 700 corresponding to a client device may include a different configuration than an embodiment of the computing system 700 corresponding to a server. For example, an embodiment corresponding to a server may include a larger storage unit 716, more memory 704, and a faster processor 702 but may lack the display driver 710, input device 712, and dimensional control device 714. An embodiment corresponding to an action camera may include a smaller storage unit 716, less memory 704, and a power efficient (and slower) processor 702 and may include multiple image capture devices 718 (e.g., to capture 360° FOV images or video).

The storage unit 716 includes a computer-readable medium 722 on which is stored instructions 724 (e.g., a computer program or software) embodying any one or more of the methodologies or functions described herein. The instructions 724 may also reside, completely or at least partially, within the main memory 704 or within the processor 702 (e.g., within a processor's cache memory) during execution thereof by the computing system 700, the main memory 704 and the processor 702 also constituting computer-readable media. The instructions 724 may be transmitted or received over a network via the network interface device 720.

While computer-readable medium 722 is shown in an example embodiment to be a single medium, the term "computer-readable medium" should be taken to include a single medium or multiple media (e.g., a centralized or distributed database, or associated caches and servers) able to store the instructions 724. The term "computer-readable medium" shall also be taken to include any medium that is capable of storing instructions 724 for execution by the computing system 700 and that cause the computing system 700 to perform, for example, one or more of the methodologies disclosed herein.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, for example, different memories in a system.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

As used herein, the terms "computing device" or "computing system" includes, but is not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps that perform a function. Such program may be rendered in virtually any programming language or environment including, for example, C/C++, C#, Fortran, COBOL, MATLABT™, PASCAL, Python, assembly language, markup languages (e.g., HTML, SGML, XML, VoXML), and the like, as well as object-oriented environments such as the Common Object Request Broker Architecture (CORBA), Java' (including J2ME, Java Beans), Binary Runtime Environment (e.g., BREW), and the like.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnee™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed is:

1. A method for blurring captured image content, the method comprising:
    selecting a plurality of frames of the captured image content, the selecting of the plurality of frames enabling an application of motion blur to at least a portion of the captured image content, wherein a number of the plurality of frames of the captured image content that is selected corresponds to an amount of the motion blur to be applied such that selection of a larger number of the plurality of frames of the captured image content results in a higher degree of the motion blur and selection of a smaller number of the plurality of frames of the captured image content results in a lower degree of the motion blur;
    selecting a plurality of pixel locations within the plurality of frames of the captured image content for the application of the motion blur;
    applying the motion blur to the at least portion of the captured image content in accordance with the selected plurality of frames and the selected plurality of pixel locations, wherein the higher degree of the motion blur is applied to the at least portion of the captured image content based on the larger number of the selected plurality of frames and the lower degree of the motion blur is applied to the at least portion of the captured image content based on the smaller number of the selected plurality of frames; and
    outputting the captured image content with the applied motion blur.

2. The method of claim 1, further comprising performing foreground/background segmentation on the captured image content prior to the selecting of the plurality of pixel locations.

3. The method of claim 2, wherein the selecting of the plurality of pixel locations comprises selecting portions of the frames associated with background portions of the frames.

4. The method of claim 1, wherein the selecting of the plurality of frames comprises selecting a sequential number of frames of the captured image content for the application of the motion blur.

5. The method of claim 1, wherein the selecting of the plurality of frames comprises selecting a non-sequential number of frames of the captured image content for the application of the motion blur.

6. The method of claim 1, wherein the selecting of the plurality of pixel locations within the plurality of frames of the captured image content for the application of the motion blur comprises selecting based on a color value for a respective pixel within the number of frames.

7. The method of claim 1, wherein the applying of the motion blur comprises using an averaging filter for the applying of the motion blur, the using of the averaging filter comprising assigning an average pixel color value over the number of frames to a respective pixel location.

8. A non-transitory computer-readable apparatus comprising a storage medium, the storage medium having a plurality of computer-readable instructions stored thereon, the computer-readable instructions being configured to, when executed by a processing apparatus, cause a computerized apparatus to apply motion blur to captured image content via:
    receipt of a selection of a number of frames of the captured image content for the application of motion blur, wherein the number of frames of the captured image content that is selected corresponds to an amount of the motion blur to be applied such that selection of a larger number of frames of the captured image content results in a higher degree of the motion blur and selection of a smaller number of frames of the captured image content results in a lower degree of the motion blur;
    receipt of a selection of a plurality of pixel locations within the number of frames of the captured image content for the application of the motion blur;
    apply the motion blur to the captured image content in accordance with the selected number of frames and the selected plurality of pixel locations, wherein the higher degree of the motion blur is applied to the captured image content based on selection of the larger number of frames and the lower degree of the motion blur is applied to the captured image content based on selection of the smaller number of frames; and
    output the captured image content with the applied motion blur.

9. The non-transitory computer-readable apparatus of claim 8, wherein the computer-readable instructions are further configured to, when executed by the processing apparatus, cause the computerized apparatus to:
    perform foreground/background segmentation on the captured image content prior to the selection of the plurality of pixel locations.

10. The non-transitory computer-readable apparatus of claim 9, wherein the receipt of the selection of the plurality of pixel locations comprises receipt of selection for portions of the frames associated with background portions of the frames.

11. The non-transitory computer-readable apparatus of claim 8, wherein the receipt of the selection of the number of frames comprises receipt of a selection of a sequential number of frames of the captured image content for the application of the motion blur.

12. The non-transitory computer-readable apparatus of claim 8, wherein the receipt of the selection of the number of frames comprises receipt of a selection of a nonsequential number of frames of the captured image content for the application of the motion blur.

13. The non-transitory computer-readable apparatus of claim 8, wherein the receipt of the selection of the plurality of pixel locations within the number of frames of the captured image content for the application of the motion blur comprises receipt of a selection based on a color value for a respective pixel within the number of frames.

14. The non-transitory computer-readable apparatus of claim 8, wherein the application of the motion blur comprises use of an averaging filter for the application of the motion blur, the use of the averaging filter comprising assignment of an average pixel color value over the number of frames to a respective pixel location.

15. A computing system comprising:
- image capture apparatus;
- processor apparatus; and
- non-transitory computer-readable apparatus comprising a storage medium, the storage medium comprising a plurality of computer instructions configured to, when executed by the processor apparatus, cause the computing system to:
  - identify content captured via the image capture apparatus;
  - select a number images from the captured content, wherein the number of images from the captured content that is selected corresponds to an amount of motion blur to be applied such that selection of a larger number of images from the captured content results in a higher degree of the motion blur and selection of a smaller number of images from the captured content results in a lower degree of the motion blur;
  - select one or more locations within the captured content based at least on a result of a foreground/background segmentation of the captured content;
  - apply at least a blurring operation to the selected one or more locations within the number of images to apply the motion blur to the captured content, wherein the higher degree of the motion blur is applied to the captured content based on selection of the larger number of images and the lower degree of the motion blur is applied to the captured content based on selection of the smaller number of images; and
  - generate blurred content in accordance with the applied blurring operation.

16. The computing system of claim 15, wherein:
the selection of the one or more locations within the captured content occurs prior to the selection of the number of images from the captured content.

17. The computing system of claim 15, wherein:
the selection of the number of images from the captured content occurs prior to the selection of the one or more locations within the captured content.

18. The computing system of claim 15, wherein:
the blurring operation comprises a summation of pixel color values at a given location within the number of images, and a division of the summation by the number of images.

19. The computing system of claim 18, wherein the selection of the number of images and the corresponding amount of the motion blur to be applied via the blurring operation are correlated with a variation of pixel values at a given location within the number of images.

20. The computing system of claim 15, wherein the selection of the one or more locations within the captured content comprises selecting a plurality of pixels within the number of images which are associated with background portions arising from the foreground/background segmentation.

* * * * *

UNITED STATES PATENT AND TRADEMARK OFFICE
CERTIFICATE OF CORRECTION

PATENT NO. : 10,997,697 B1
APPLICATION NO. : 16/235292
DATED : May 4, 2021
INVENTOR(S) : David A. Newman et al.

Page 1 of 1

It is certified that error appears in the above-identified patent and that said Letters Patent is hereby corrected as shown below:

In the Claims

Claim 8, Column 26, Line 43, delete "apply" and insert --application of--, therefor.

Claim 8, Column 26, Line 51, --output the captured-- should be changed to --output of the captured--, therefor.

Claim 15, Column 27, Line 30, --select a number images-- should be changed to --select a number of images--, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*